United States Patent [19]
Fine

[11] 3,790,020
[45] Feb. 5, 1974

[54] DRUM SEAL GASKET

[76] Inventor: Harry H. Fine, 144-14 Jewel Ave., Kew Garden Hills, N.Y. 11307

[22] Filed: June 5, 1972

[21] Appl. No.: 259,546

[52] U.S. Cl. .......................... 220/46 R, 220/55 AN
[51] Int. Cl. .... A47j 27/08, A47j 36/10, B65d 45/00
[58] Field of Search ....... 220/46 R, 55 AN; 229/5.7; 215/95, 96; 292/256.67

[56] References Cited
FOREIGN PATENTS OR APPLICATIONS
780,193   3/1968   Canada ............................ 220/46 R

*Primary Examiner*—George T. Hall
*Attorney, Agent, or Firm*—Cumpston, Shaw & Stephens

[57] ABSTRACT

An open head drum has a head curl which receives a gasket and a cover to effect closure of the drum. The gasket includes one portion formed as an annulus having an interiorly disposed channel in which the head curl is received and a skirt portion engaging the outside wall of the drum. A cover for the drum has a lip engaging the gasket annulus at the top surface of the drum curl. A locking ring has an upper lip pressing the cover lip toward the drum curl and a lower lip pressing the gasket annulus against the underside of the drum curl. The locking ring also has an annular skirt for pressing the annular lip of the ring gasket against the outside surface of the drum.

1 Claim, 4 Drawing Figures

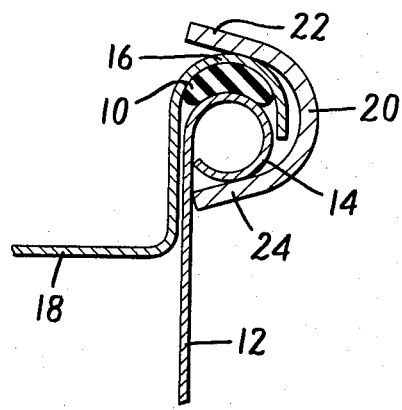
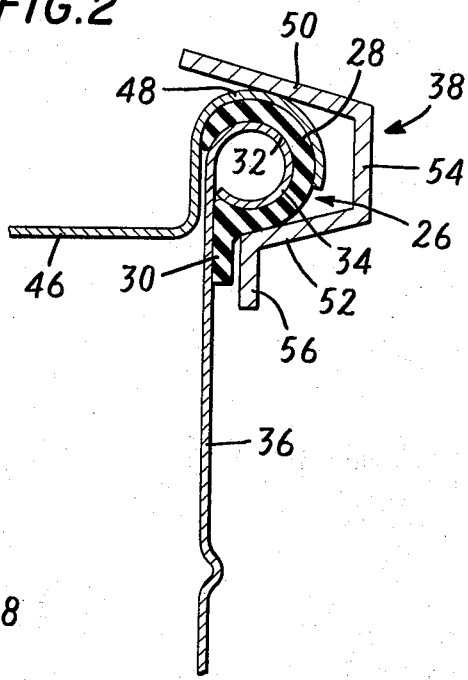
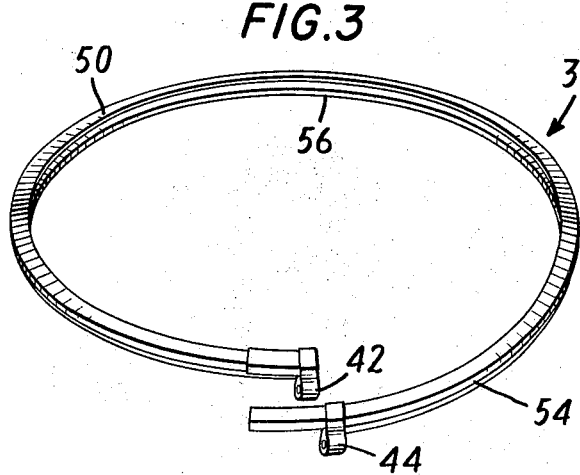
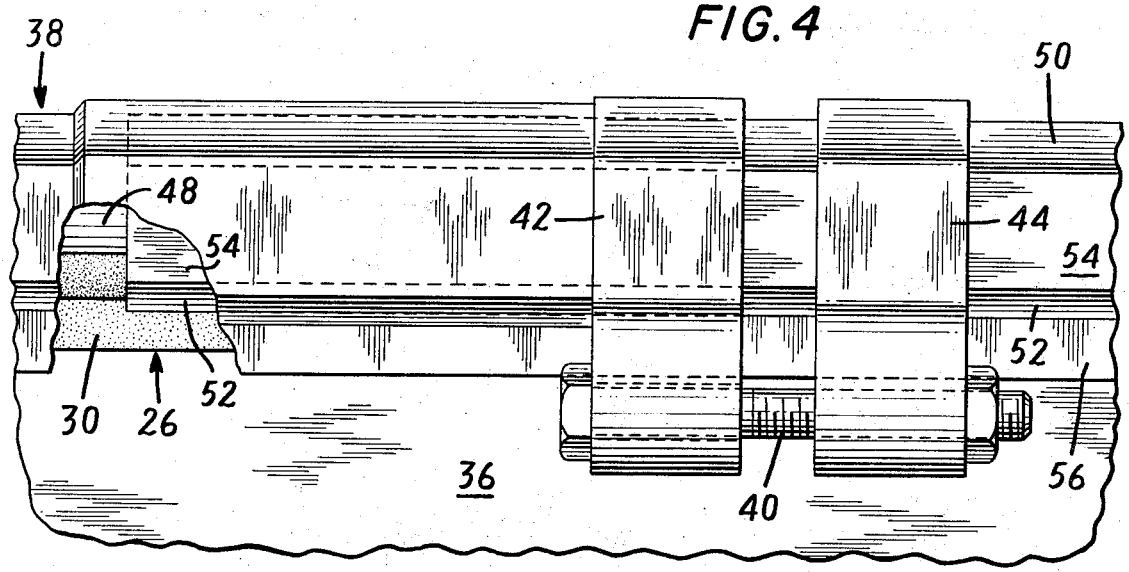

DRUM SEAL GASKET

BACKGROUND OF THE INVENTION

This invention relates generally to full open head drums and more particularly to a multiple-seal ring gasket for use on open head drums.

Full open head drums are now almost universally used in the shipment of all types of commodities except liquids. They are used for the packaging of dry powders, pastes, semi-solids, paints, viscous liquids and special applications such as high priced component parts such as automotive and airplane equipment. The success of full open head drums has in part been due to the quick closure components employed thereon. However, these drums have a particular defect in that the gaskets employed thereon presently tend to move out of place when the cover is being applied to the drum. The known gaskets have a configuration which when the drums are stacked the gaskets loose resiliency, for example, when they are palletized, and the gasket will take a set so that upon removal of the drums from a stacked relationship the gasket may permit fluid or air to leak into the drum. A further disadvantage of known gaskets was that the sealing area was limited. Thus, if a drum was off-size or out of round, there was a likelihood that a leak could occur as compared to a gasket having a multiplicity of fluid-tight seals wherein if one seal fails, another seal still remains.

According to the present invention the aforementioned disadvantages of known prior art drum closures are overcome by providing a multi-seal gasket which will allow for drums which are off-size or out-of-round, and will effect a multiplicity of fluid-tight seals so that if one seal fails, another seal is present.

An object of the present invention is to overcome the aforementioned disadvantages of known drum closures and to provide a multi-seal gasket which is easily applied and readily removed.

A further object is to provide a drum gasket which may be used without requiring bonding of the gasket on the drum.

A further object is to provide a multi-seal gasket which effects three different sealing areas so that if one seal area fails, there are two sealing areas remaining.

Other features and advantages of the drum closure in accordance with the present invention will be better understood as described in the following specifications, drawings and claims.

SUMMARY OF THE INVENTION

An open head drum has a head curl which receives a gasket and a cover to effect closure of the drum. The gasket is made of resilient material and comprises an annulus having an interiorly disposed channel in which the head curl is received. The gasket also has an annular skirt which engages the outside of the drum. A cover for the drum has a lip engaging the gasket annulus at the top surface of the drum curl. A locking ring has an upper lip pressing the cover lip toward the drum curl and a lower lip pressing the gasket annulus against the underside of the drum curl. The locking ring also has an annular skirt for pressing the annular lip of the gasket against the outside surface of the drum.

BRIEF DESCRIPTION OF THE DRAWINGS

FIG. 1 is a sectional view of a prior art drum closure in which a gasket is disposed between the upper portion of the drum curl and the underside of the cover lip.

FIG. 2 is a sectional view of a drum closure according to one embodiment of the present invention showing a multiple-seal ring gasket applied to an open head drum.

FIG. 3 is a perspective view of the locking ring used in the drum closure shown in FIG. 2.

FIG. 4 is a fragmentary view, partially broken away, of an adjustable mechanism which may be used for taking up the locking ring.

DESCRIPTION OF THE PREFERRED EMBODIMENT

This invention may be used on various types of drums but is particularly applicable to open head drums and more particularly open head drums of the type where locking rings are employed. As used herein the term drum is generic to include containers of the type having an outer head bead or curl at the open end thereof. This outer head bend or curl is sometimes referred to as a false wine bead.

FIG. 1 shows a known prior art ring gasket 10 for use on an open head drum 12. The gasket 10 is disposed on a bead or curl 14 on the drum 12 and a lip 16 on a cover 18 extends over the top of the gasket 10 and curl 14. A conventional locking ring 20 has an upper lip 22 which engages the top of the cover lip 16 and a lower lip 24 which engages the underside of the curl 14. An adjustable mechanism (not shown) is operable to take up on the locking ring 20 so that that latter is pulled in. When the locking ring 20 is pulled in the cover lip 16 and drum curl 14 are urged towards one another to thereby compress the gasket 10.

This prior art arrangement has the disadvantage that the gasket 10 tends to move out of place when the cover 18 is applied to the drum 12. Thus, difficulties arise in first placing the gasket 10 in position on the curl 14 and getting it to stay in position while the cover 18 is applied. Another disadvantage of this prior art arrangement was that the configuration of the gasket 10 was such that when the drums are stacked, the gasket 10 would loose resiliency. For example when the drums are palletized the gasket will take a set so that upon removal of the drum from a stacked relationship, the gasket may permit fluid or air to leak into the drum. Yet another disadvantage of this prior art arrangement was that the sealing area was limited in that there was only one sealing area. Thus, if a drum was off-size or out of round, there was a likelihood that a leak could occur as compared to a gasket sealing arrangement having multiplicity of fluid-tight seals wherein if one seal fails, another seal still remains.

In addition, after the locking ring 20 was used for sometime, it would tend to open up so that the locking ring 20 would pull in more to the extent that the end of lower lip 24 would engage the side of the drum 12, thereby resisting further tightening of the locking ring 20 on the drum.

The multiple seal drums gasket according to the illustrated embodiment of the present invention comprises a gasket 26 having an annulus or bead 28 and a downward depending skirt or flange 30. The annulus 28 is of generally arcuate configuration in cross section and has formed on the interior thereof surfaces defining an interior concave channel 32 which is dimensioned to fit snugly over a curl 34 on a drum 36. It will be understood that beads or curls on containers are made of different diameters so that the size of the concave channel 32 of the annulus 28 is made to conform to the diameter of the particular curl which it is to be used on. The annulus 28 fits over the top of the curl 34 and also covers the underside of the curl. The annulus 28 terminates on the curl 32 so that it never comes into contact with the contents of the drum.

The skirt 30 which is provided on the gasket 26 extends downwardly therefrom in position for peripherally engaging the outside wall surface of the drum 36 along a limited axial extent. The skirt 30 engages the wall surface of the drum to effect an annular sealed area as will be described in greater detail.

The annulus 28 and the skirt 30 each may have substantially uniform thickness and the annulus 28 has a free and terminating substantially in the same plane as the outer surface of the skirt 30 when viewed in cross section. The skirt 30 may be anywhere from about one-half inch to about 1 inch wide and the annulus 28 has an inner diameter corresponding to the diameter of the curl 34.

The gasket 26 illustrated is preferably made of a resilient material that is not attacked by solvents, for example, neoprene, rubber, paper, fiber, plastic compositions. Other materials, for example sponge, cork, cellulose and non-toxic, non-inflammable materials may be used. The gasket 26 is preferrably made of resilient, stretchable material extended as a strip and then cut to size to fit the dimension of the size drum to which it is to be applied. The ends of the strip are secured or bonded, for example by a staple or adhesive to form the gasket as a continuous ring gasket.

The gasket 26 according to the present invention is applied to a conventional open head drum 36 in which a locking ring 38 having an adjustable mechanism comprising a bolt 40 (FIG. 4) passing through lateral projections 42, 44 for taking up the locking ring 38 and pulling up on a cover 46 disposed over the gasket 26 as hereinafter explained. The cover 46 is provided with a lip 48 extending substantially over the top of the gasket 26 in position for compressing the curl 34. The lateral projections 42, 44 are suitably affixed to the locking ring 38 by welding or the like.

The locking ring 38 has an upper lip 50 and a lower lip 52 each having a frusto-conical configuration and going away from the drum 36. An annular exis 54 generally parallel to the axis of the drum joins the converging upper and lower lips 50 and 52 respectively. The upper locking ring lip 50 engages the top of the cover lip 48 and the lower locking ring lip 52 engages the bottom of the annulus 28. The locking ring 38 also has a depending annular skirt or flange 56 which extends downwardly from the lower locking ring lip 52. The annular skirt 56 is generally parallel to the axis of the drum. As will be described in greater detail, the skirt 56 engages the outer surface of the gasket skirt 30 to urge the latter against the side wall of the drum to effect an annular sealed area.

When the bolt 40 is taken up to take up the locking ring 38 the upper locking ring lip 50 engages the outer periphery of the cover lip 48 and the lower locking ring lip 52 engages the lower section of the gasket annulus 28 whereby the gasket 26 is compressed therebetween more specifically, the upper locking ring lip 50 engages the cover lip 48 so that the latter presses the upper portion of the annulus 28 against the upper portion of the drum curl 34 to effect a seal between the cover lip 48 and annulus 28 and between the latter and the curl 34. Simultaneously, the lower locking ring lip 52 engages the lower section of the annulus 28 to press the latter against the underside of the curl 34 to effect a seal between the curl 34 and the annulus 28 and between the latter and the locking ring lower lip 52. In this regard it will be observed that the construction of the locking ring 38 employing converging upper and lower lips 50 and 52 respectively joined by an annular wall 54 results in clamp-like action acting on the cover lip 48 and drum curl 34. Thus it will be seen in FIG. 2 that as the locking ring 38 is urged to the left, the upper and lower lips 50 and 52 will be urged further apart. As they are urged apart, however, the resiliency of the metal of the locking ring 38 tends to return the upper and lower lips 50, 52 to their original position with a greater force. Thus the locking ring 38 acts as a spring clamp to effect the heretofore mentioned seal areas on the top and bottom sections of the drum curl 34. The frusto-conical surfaces 50 and 52 offers a greater resistance to separating and thereby provide better clamping action than the arcuate surfaces in the known prior art devices.

A third seal is formed between the depending skirt 56 on the locking ring 38 and the outer wall surfaces of the drum 36. The latter is effected as the locking ring skirt 56 presses the skirt 30 on the gasket 26 against the side wall of the drum 36 thus this third seal is effected over an area determined by the annular overlapping area of the gasket skirt 30 and locking ring skirt 56. The locking ring 38 is constructed and arranged so that the upper and lower lips 50, 52 will be spread to effect the heretofore described spring-like clamping action on the cover lip 48 and drum curl 34 before the locking ring skirt 56 engages the gasket skirt 30. FIG. 3 shows the position of the parts just before the locking ring 38 is fully taken up. When the locking ring 38 is in its completely assembled position and fully taken up, the locking ring skirt 56 will press the gasket skirt 30 against the drum to form the third seal as heretofore described. As the locking ring skirt 56 presses the gasket skirt 30, the resiliency of the latter will permit the locking ring skirt to be drawn up further than would be the case in prior art devices where the end of the locking ring would engage the side of the metal drum as previously described.

It will be seen that as the bolt 40 is taken up the locking ring 38 fits snugly around the cover lip and gasket and an effective triple seal is formed precluding any possibility of fluid flow inwardly into the drum or outwardly therefrom. Moreover, the annulus and skirt tend to hold the gasket in position when applied so that there is no need of bonding the gasket on the drum. The gasket is readily applied and can be removed for cleaning the drum. In assembled position the ends of the locking ring 56 overlap each other so that the gasket 26 is effectively sealed by the locking ring 56 over a full circle with no gaps.

The invention provides a multiple-seal gasket usable with various types of adjustment means on the locking ring. The gasket in combination with the drum component parts forms s triple seal and eliminates leakage by three independent seal areas after the cover and locking ring are mounted on the drum. A positive seal is constantly provided by the gasket. Thus, for example, if the drums are attacked or palletized and the seal effected on the top of the curl is weakened or lost due to set in the gasket or loss of resiliency, the seals on the underside of the curl and between the gasket skirt and locking ring skirt are still present.

It will be understood that the gasket according to the invention is likewise applicable to lever-bolt locking rings and to bung drums converted to open head drums.

While preferred embodiments of the invention have been shown and described it will be understood that many modifications and changes can be made within the true spirit and scope of the invention.

I claim:

1. In an open head drum having a head curl, a ring gasket on said drum made of a resilient material comprising an annulus having an interiorly disposed channel in which said head curl is received, said ring gasket having an annular skirt of the same material extending from said annulus to engage the outside wall surface of said drum, a cover for covering said drum having a lip engaging said an annulus at at least the top surfaces of said curl, and a locking ring having an upper lip for pressing said cover lip toward said curl and a lower lip for pressing said annulus against the underside of said curl, the improvement comprising:

a. said locking ring having an annular portion depending from said lower lip for pressing said annular skirt of said ring gasket against the outside surface of said drum;
   b. said upper lip and said lower lip of said locking ring are each defined by a frusto-conical surface;
   c. said frusto-conical surface of said upper lip extends downwardly and outwardly relative to the axis of the drum and said frusto-conical surface of said lower lip extends upwardly and outwardly relatively to the axis of the drum;
   d. said upper lip and lower lip of said locking ring are integrally joined by the cylindrical portion having an axis coincident with the axis of the drum;
   e. said annular portion on said locking ring is of generally cylindrical and continuous form having an axis coincident with the axis of said drum;
   f. said locking ring upper lip engages said cover lip to press the latter against said annulus and to press the annulus against said curl thereby to effect a seal between said cover lip and said annulus and between the latter and said curl;
   g. said locking ring lower lip engages said annulus to press the latter against the underside of said curl, thereby to effect a seal between said curl and said annulus and between the latter and said locking ring lower lip;
   h. said locking ring annular portion presses said annular skirt of said ring gasket against said drum to thereby effect a seal between said locking ring annular portion and said annular ring gasket skirt and between the latter and the outside surface of the drum;
   i. said locking ring is made of metal having resilient properties of the type which permit the upper and lower lips thereof to be spread as the locking ring is pulled into place on the drum and cover, said locking ring thereupon exerting a spring-like clamping action on the cover lip, annulus, and curl which are disposed between the spaced upper and lower lips of said locking ring; and
   j. means on said locking ring for taking up the locking ring and pulling the latter up on the cover lip and the underside of said curl to thereby force said upper and lower lips of said locking ring to spread and thereupon exert said spring-like clamping action on said cover lip, annulus, and curl.

* * * * *